United States Patent [19]
Arathoon

[11] Patent Number: 5,809,871
[45] Date of Patent: Sep. 22, 1998

[54] COOKING APPARATUS

[75] Inventor: Barbara Arathoon, Melbourne, Australia

[73] Assignee: Mercury Far East Limited, Grand Turk, Turks/Caicos Islands

[21] Appl. No.: 741,962

[22] Filed: Oct. 31, 1996

[30] Foreign Application Priority Data

Jan. 11, 1996 [AU] Australia .................................. PN7509

[51] Int. Cl.$^6$ .................................................. A47J 37/00
[52] U.S. Cl. ................................. 99/380; 99/372; 99/426
[58] Field of Search ........................... 99/377, 379, 426, 99/380, 374, 372; 219/520, 524, 525

[56] References Cited

U.S. PATENT DOCUMENTS

| | | | |
|---|---|---|---|
| 1,732,347 | 10/1929 | Weisenborn | 99/377 |
| 2,354,240 | 7/1944 | Young et al. | 99/379 X |
| 4,054,086 | 10/1977 | McNair | 99/374 |
| 4,091,720 | 5/1978 | Wheeler | 99/375 |
| 5,154,115 | 10/1992 | Kian | 99/380 |
| 5,363,748 | 11/1994 | Boehm et al. | 99/379 X |

FOREIGN PATENT DOCUMENTS

| | | |
|---|---|---|
| 0 696 430 A1 | 2/1996 | European Pat. Off. . |
| 1 575 264 | 9/1980 | United Kingdom . |
| 2 276 809 | 10/1994 | United Kingdom . |

*Primary Examiner*—Reginald L. Alexander
*Attorney, Agent, or Firm*—Darby & Darby

[57] ABSTRACT

An apparatus for cooking or heating a material has a base formed from a thermally conductive material. The base has a floor and a wall which define a receptacle adapted to receive the material to be heated. The cooling apparatus further includes a lid, also formed of a thermally conductive material. A heat source is provided in thermal connection with the wall. A second heat source may also be provided in thermal connection with the lid. The lid is provided with a vent to permit fluids generated during use of the apparatus to escape.

18 Claims, 5 Drawing Sheets

COOKING APPARATUS

FIELD OF THE INVENTION

The invention relates generally to an apparatus for cooking or heating a material simultaneously on both of its sides. The invention has particular, although by no means exclusive application to apparatus for cooking food which must be cooked simultaneously on its top and bottom surfaces, such as a pizza.

BACKGROUND OF THE INVENTION

Many foods require cooking on both sides. Such foods are cooked better and more quickly if both sides of the food can be cooked simultaneously. The invention is directed towards such foodstuffs and will be described with particular reference to pizzas. However it will be apparent to one skilled in the art that foods such as cakes, pancakes, crepes and omelettes can also be usefully be cooked in this way. Further, eggs, sausages and vegetables can also usefully be cooked it the apparatus of the invention.

Pizzas traditionally cooled in large ovens. Such ovens take a substantial period of time in which to warm up. They also use a significant amount of energy, both in warming up and maintaining a given temperature. They are therefore expensive to run, particularly if only a small part of the oven is being used for cooking purposes. They are also not suitable for use in ordinary homes. Even domestic ovens are inefficient in use of energy for cooking or heating relatively small materials.

Electric frying pans are known but they do not effectively cook both sides of a food simultaneously. In known electric frying pans, the heater element is located underneath the base of the frying pan and the lid is made from a material which does not retain heat, and which is often not a good conductor of heat. Usually the lids of electric frying pans are made from pressed metal or a transparent rigid polymer, such as Perspex. Thus, there is effectively no radiant heat provided from the lid to the top surface of the food being cooked, and thus the cooking function is restricted to one side of the food only.

Electrical toasted sandwich makers are also known in which there is a heating element in both the top and bottom components of the cooking apparatus. They are designed so that there is no space between the top surface of the food being cooked and the bottom surface of the lid. This is necessary in a toasted sandwich maker to ensure that the bread cooks properly, while at the same time being prevented from becoming soggy. However with a food such as a pizza, this space is necessary so as not to damage the top of the pizza However, as a result of this space being provided, it is necessary to provide an escape for steam generated during the cooking process which would otherwise build-up in this space. Known sandwich makers do not have this form of construction. They also require a thermostat which increases cost of production. Further, they cannot safely be immersed into water.

Accordingly, there is a need for a cooking apparatus which will evenly heat a layer of food, such as a pizza, over its top surface and bottom surfaces simultaneously which can rise to operating temperature quickly and with a lower consumption of energy than known devices and which can also operate without a thermostat and be immersed into water for easier cleaning. Accordingly, the invention proposes a device for cooking food which has one or more of these advantages.

SUMMARY OF THE INVENTION

The invention generally provides an apparatus for cooking or heating a material, the apparatus including:

a base formed from or containing a thermally conductive material, the base having a floor and a wall extending along the perimeter of the floor, the arrangement of the wall and the floor being such as to define a receptacle adapted, in use of the apparatus, to receive or contain the material, and in which the wall further has a first sealing means; and a lid formed from or containing a thermally conductive material, the lid having a second sealing means, wherein, in use of the apparatus, the first and second sealing means cooperate with one another so as to define generally sealed container in which the material can be cooked or heated.

In preferred embodiment of the invention, there is further provided a heat source located generally adjacent to, and in thermal connection with, the wall. Preferably, the heat source is located generally adjacent to, and in thermal connection with, both the wall and the first sealing means. In another preferred embodiment of the invention, a second heat source is located in the lid adjacent to, and thermally connected with, the second sealing means.

In a preferred form of the invention, the first sealing means and the second sealing means are mating surfaces or structures on the base and lid respectively. Preferably, the first sealing means further cooperates with the second sealing means so as to enable thermal conductivity between the base and the lid.

In a further preferred embodiment of the invention, the lid is further provided with means, typically in the form of a vent, to permit any fluids (which may be gases, liquids or a mixture of both, such as steam) generated in the container during use of the apparatus to escape from the container.

The heat source is preferably an electric heating element. This type of element is well known to those skilled in the art. Preferably, there is also provided means for the supply of electricity to the electric heating element and sealing means such that the apparatus can be safely immersed in water, or water mixtures, for cleaning purposes.

Preferably, the apparatus further includes a support housing to separate the base and lid from a supporting surface, such that the supporting surface is not damaged by heat radiating from the base or lid in use. The support housing preferably has legs of thermally non-conductive material.

In a yet further preferred embodiment of the invention, the floor is disc-shaped and the wall surrounds the circumference of the floor.

It is also preferred for one or more of the floor, wall, first sealing surface, second sealing surface and an underneath surface of the lid to be coated with teflon, or another non-stick material known to those skilled in the art In a further preferred embodiment of the invention, there is a cavity defined by the plane in which the second sealing surface lies and an underneath surface of the lid, the vent being located in the lid so as to permit the escape of steam from the cavity through the steam vent.

One or more handles can advantageously be fitted to the base in a manner which limits the conduction of heat from the base to the handles. In a further preferred embodiment, the lid has one or more handles.

Preferably, the steam vent is sufficiently small that there is no substantial break in the evenness of radiation of heat from the lid. The lid is preferably of sufficient weight that it cannot be lifted by the internal pressure of steam when the steam vent is operating.

Preferably further, the base and lid are connected by a hinge means, so that the lid may be conveniently opened by gripping one or more handles provided on it, and wherein the hinge means enable the lid to be closed so as effectively to seal the apparatus, for use in a cooking or heating operation.

BRIEF DESCRIPTION OF DRAWINGS

A preferred embodiment of the invention will now be illustrated by way of example with reference to the accompanying drawings in which.

DESCRIPTION OF A PREFERRED EMBODIMENT

Figure 1:
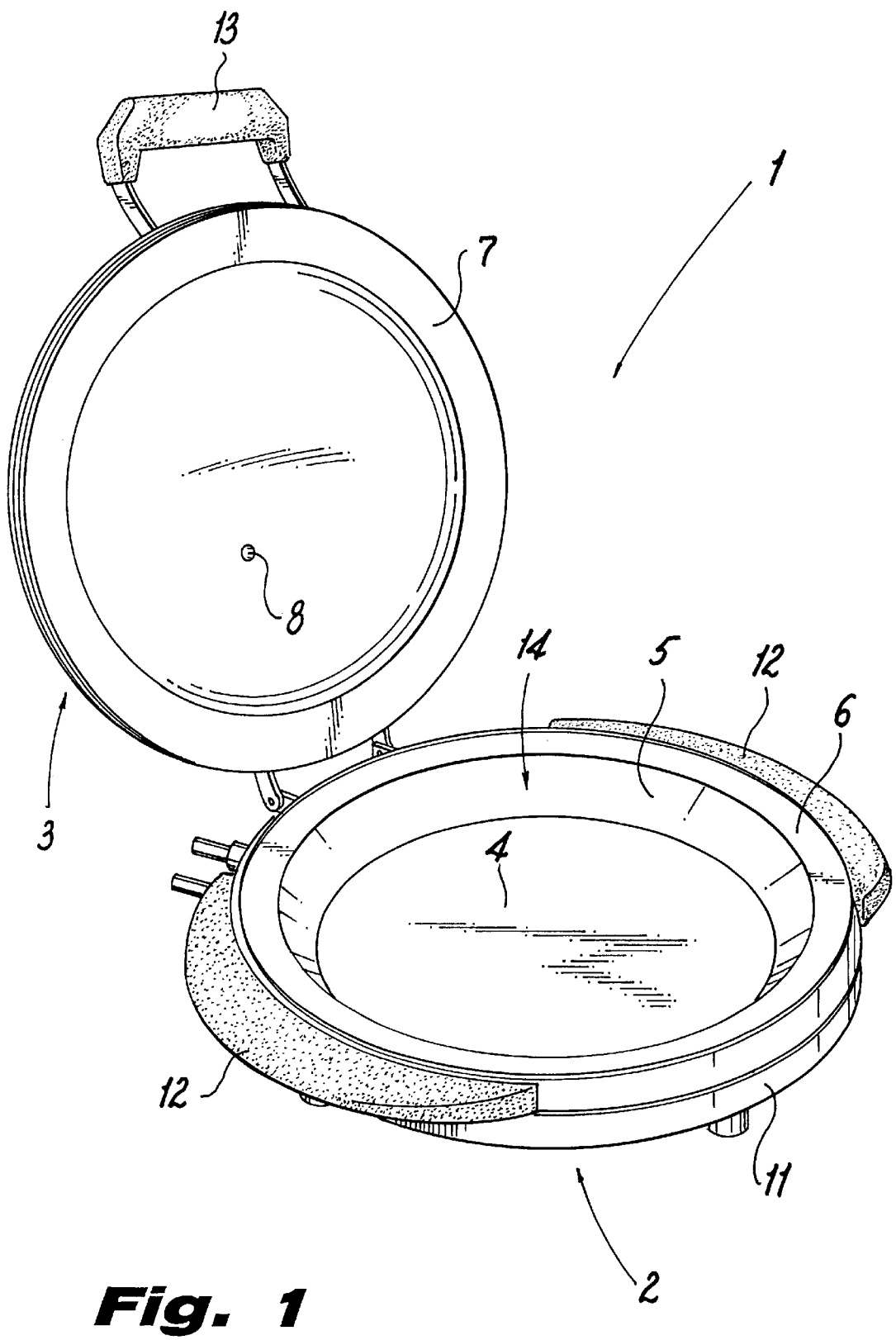
FIG. 1 shows a perspective view of an apparatus constructed in accordance with one preferred embodiment of the invention (with the lid in an "open" position, as described below).

For convenience only, in the drawings illustrating the invention, like numerals in the drawings refer to like components.

Referring to the drawings, FIG. 1 illustrates an apparatus 1 for cooking or heating a material which has a base 2 and a lid 3. The base 2 has a floor 4 and a wall 5 extending along the perimeter of the floor 4, which together define a receptacle 14. A first sealing means in the form of a surface 6 is shown as being provided at the top of wall 5.

Lid 3 has a second sealing means, in the form of a surface 7. Lid 3 also has a vent 8, which is formed by making a relatively small aperture in the lid 3.

In the embodiment of the invention shown in FIG. 1, base 2 is supported by support housing 11 to separate the base 2 from a supporting surface (not shown), such as a kitchen bench. Further, handles 12 and 13 are provided on the base and lid respectively.

Figure 2:
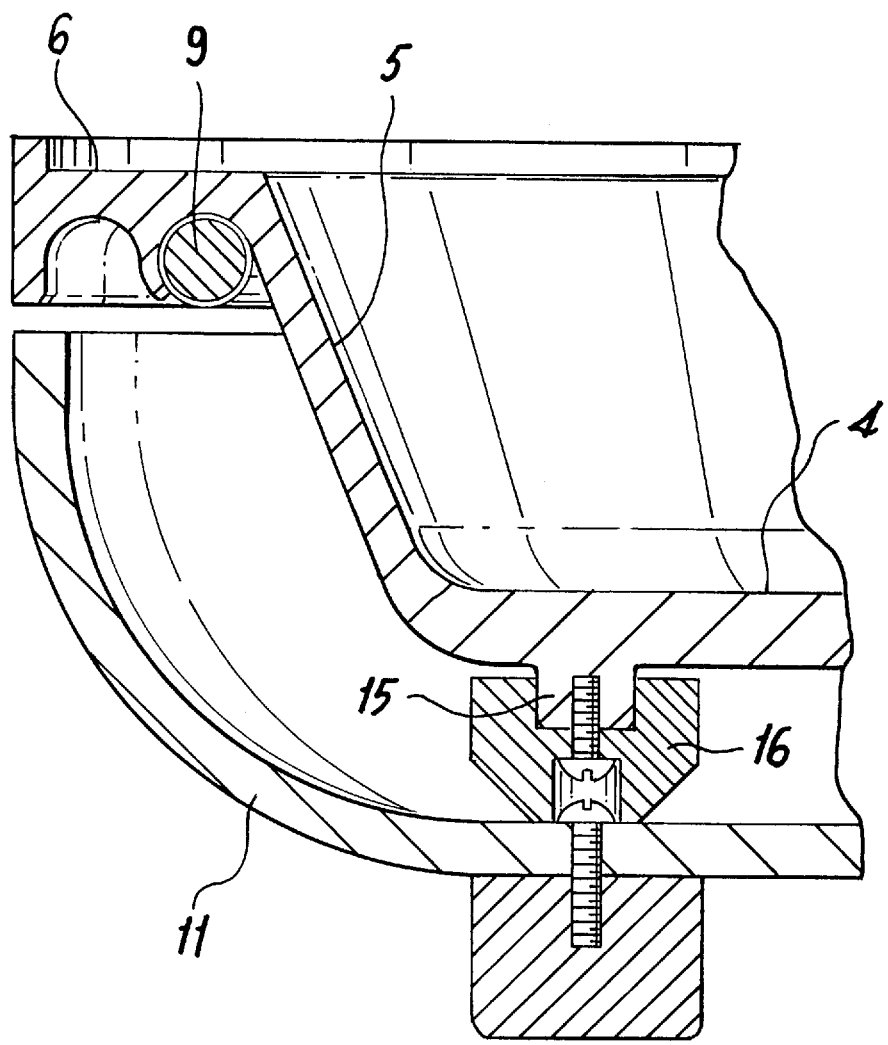
FIG. 2 shows a cross section of the base of the same embodiment of the invention as shown in FIG. 1.

As can be seen more clearly in FIG. 2, a heat source in the form of an electrical element 9 is shown as being located generally adjacent first sealing surface 6. Further, FIG. 2 also shows legs 15 on base 2 which rest on spacer 16 in order to support base 2 spaced from support housing 11. As will be apparent to one skilled in the art, there are many appropriate materials and constructions for spacers 16, and means for connecting base 2 to support housing 11, and the exact construction used is not relevant to the above invention.

Figure 3:
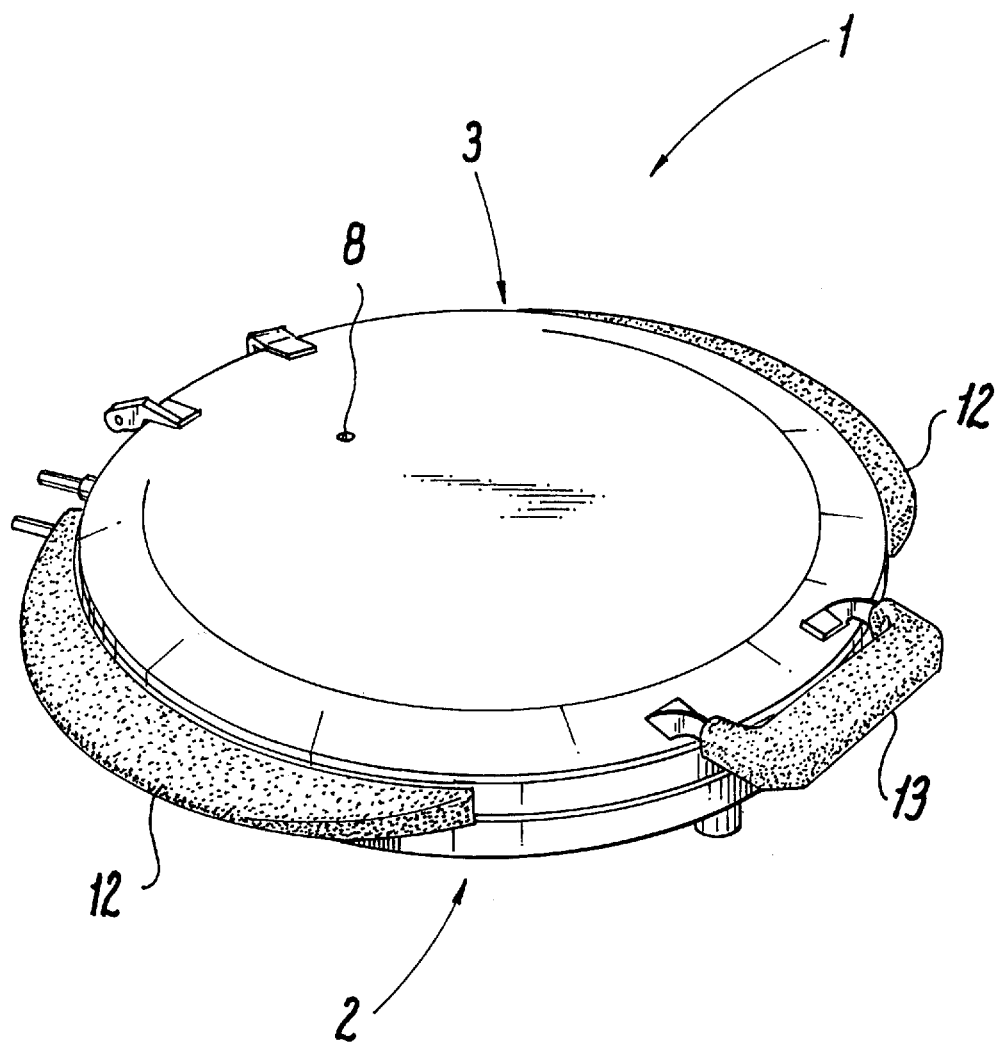
FIG. 3 shows a perspective view of the same embodiment of the invention as shown in FIG. 1 (with the lid in a "closed" position, as described below).

As is apparent from FIG. 1 and 3, the lid in the embodiment shown is hingedly connected to the base and moveable from an "open" position (as shown in FIG. 1) to a "closed" position (as shown in FIG. 3). It will apparatus to one skilled in the art that the "open" position is for inserting or removing the material (such as food) to be cooked or heated and that the "closed" position is for the cooking or heating operation.

Figure 5:
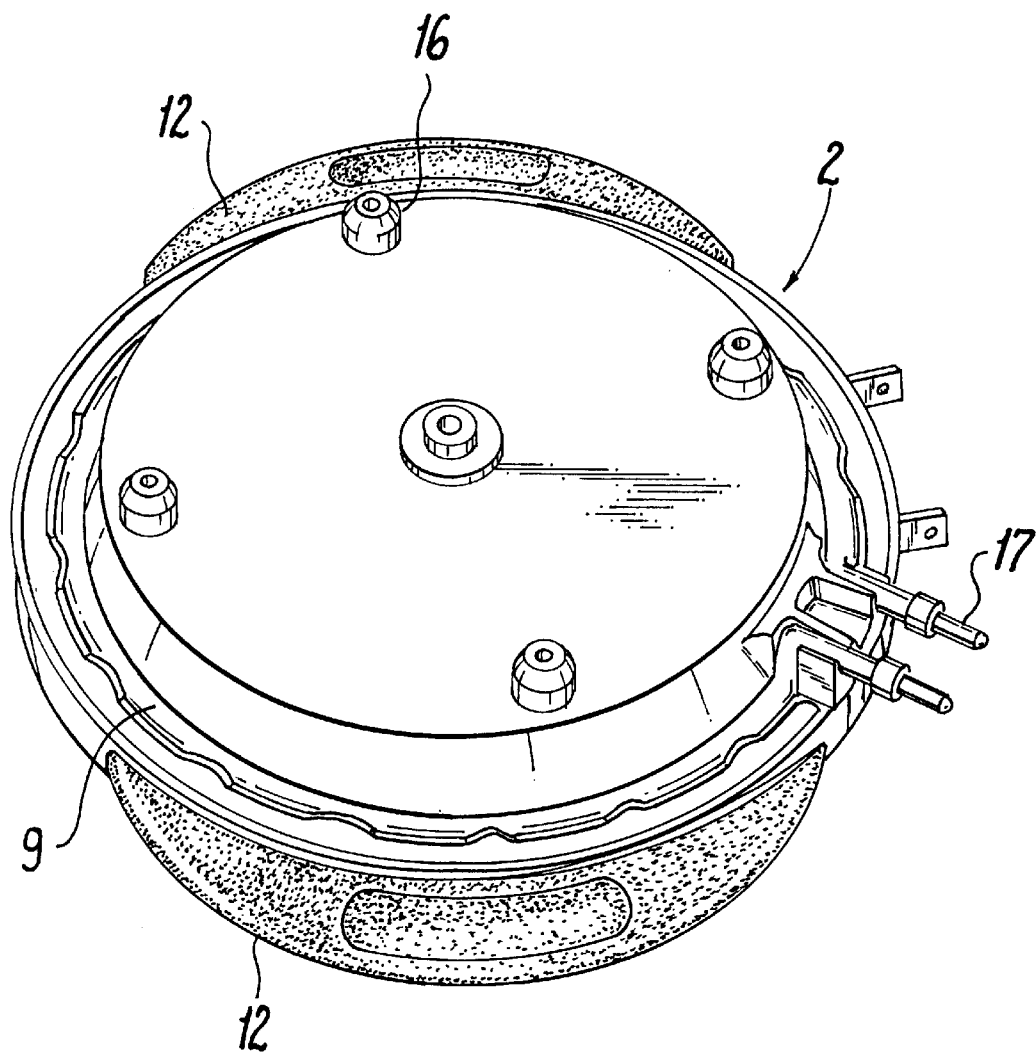
FIG. 5 shows a bottom perspective view of the same embodiment of the invention as shown in FIG. 1.

As shown in FIG. 5, where the heat source is an electrical element, the base is also fitted with means 17 for supplying electricity to the electrical element, in a manner known to those skilled in the art FIG. 5 also shows electrical element 9 located around the perimeter of wall 5.

Figure 4:
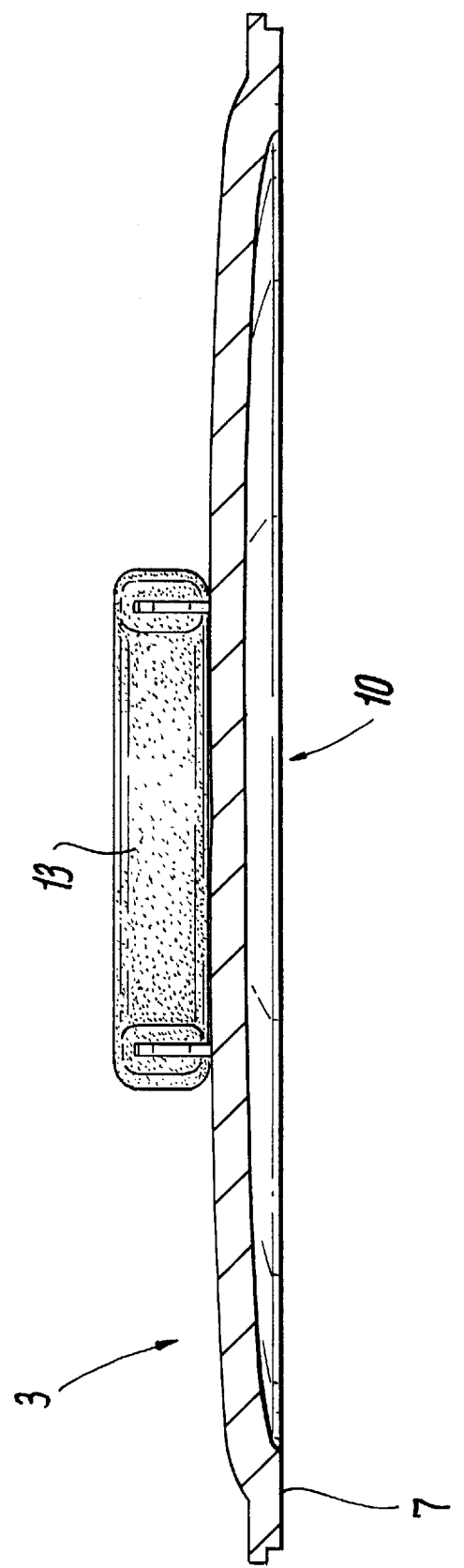
FIG. 4 shows a cross sectional view of the lid according to the same embodiment of the invention as shown in FIG. 1.

FIG. 4 shows a lid 3 which defines a cavity 10 between its underneath surface 11 and the plane of second sealing surface 7.

In use, the material is placed in the receptacle 14 defined by the floor 4 and contained by wall 5. In the case of a pizza, the dough would be placed on the floor 4 and might abut against the internal surface of the wall 5. The topping for the pizza would then be placed on top of the dough. While the apparatus could be preheated before the dough is inserted, this is not necessary. When cooking or heating some other foods or materials, or to suit some tastes in pizzas, this may however be desirable.

Once the food or material is inserted, lid 3 is moved to the "closed" position. Energy, such as electricity, is then supplied to the heat source 9. Heat from the heat source 9 is distributed evenly throughout the base 2 and radiates to the food or material contained in the receptacle 14. Importantly, because of the location of the heat source 9 and because the first sealing surface 6 seals with the second sealing surface 7, heat is also conducted from the heat source 9 through first sealing surface 6 to second sealing surface 7 and then throughout the remainder of lid 3 in an even fashion. This causes both sides of the material to be simultaneously heated or cooked. In the case of cooking a pizza, this causes even "browning" over the entire top surface of the pizza rather than faster browning at the edges which often occurs in known devices (which therefore leaves the central portion of the food undercooked).

Support housing 11 shields a supporting surface (on which the apparatus rests) from radiant heat from base 2.

During the cooking or heating process, any fluid or gas (such as steam) generated inside the apparatus can escape through the vent 8. Further, the food or material can be checked regularly without substantial heat loss because of relatively small amount of hot air which is lost upon opening the apparatus, compared with the amount of hot air lost when opening a conventional oven. Further, the base 2 and lid 3 retain a substantial amount of heat such that the to temperature inside the apparatus 1 is rapidly returned to its level before the apparatus was opened. Further, the vent 8 reduces the build up of fluids or gases, such as steam, within the apparatus 1, and particularly within cavity 10.

While a number of materials are suitable to form the base 2 and the lid 3, die cast aluminium is a particularly appropriate material having regard to its thermal conductivity properties, its price and its use in other cooking appliances. For appearance, another material may be layered on the outside of the base 2, lid 3 and/or housing 11, including an enamel. The first sealing surface 6 and second sealing 7 are preferably machined so as to fit closely together to enable thermal conductivity from one to the other. The handles and supporting housing will generally be made from a non-thermally conductive material so as to minimise the risk of burns to users. Appropriate materials for electrical heating elements are well known to those skilled in the art.

In another preferred embodiment of the apparatus (which is not illustrated), a second heat source is provided in the lids, either next to or adjacent the second sealing surface, to permit even heating of to lid. This second heat source provides more rapid cooking of the food and more rapid heating of the apparatus. When cooking a pizza, for example, more thorough browning of the top is achieved by providing a second heat source, in the manner described. It also enables the internal temperature of the apparatus to reach a higher level than with a single heat source apparatus.

It will be apparent from the preceding description that an apparatus for cooking or heating a material, including food, as described above will use less energy than a conventional oven. Further, it does not require a thermostat, it can be immersed safely into water after use, and it evenly heats the material contained within it on both sides simultaneously.

Other advantages, modifications to and uses of the invention and its construction as described above will be apparent to those skilled in the art and all such modifications, adaptations and uses are included in the scope of the invention.

I claim:

1. Apparatus for cooking or heating a material, the apparatus including:
    a base formed from or containing a thermally conductive material, the base having a floor and an inner wall extending along the perimeter of the floor, the arrangement of the inner wall and the floor being such as to define a receptacle adapted, in use of the apparatus, to receive or contain the material, and in which the inner wall further has a first sealing means; and
    a lid formed from or containing a thermally conductive material, the lid having a second sealing means; an outer wall surrounding said inner wall;
    a heat source located adjacent to said inner wall, said heat source in thermal conductivity with said inner wall; and positioned between said outer and inner walls;
    wherein, in use of the apparatus, the first and second sealing means cooperate with one another so as to define a generally sealed container in which the material can be cooked or heated.

2. Apparatus according to claim 1, wherein the heat source is located generally adjacent to, and in thermal connection with, both the inner wall and the first sealing means.

3. Apparatus according to claim 1, wherein a second heat source is located in the lid adjacent to, and thermally connected with, the second sealing means.

4. Apparatus according to claim 1, wherein the first sealing means and the second sealing means are mating surfaces or structures on the base and lid respectively.

5. Apparatus according to claim 4, wherein the first sealing means further cooperates with the second sealing means so as to enable thermal conductivity between the base and the lid.

6. Apparatus according to claim 1, further comprising vent means for permitting any fluid(s) generated in the container during use of the apparatus to escape from the container.

7. Apparatus according to claim 1, wherein the heat source is an electric heating element.

8. Apparatus according to claim 7, further comprising means for the supply of electricity to the electric heating element and sealing means such that the apparatus can be safely immersed in water, or water mixtures, for cleaning purposes.

9. Apparatus according to claim 1, further comprising a support housing to separate the base and lid from a supporting surface, such that the supporting surface is not damaged by heat radiating from the base or lid in use.

10. Apparatus according to claim 9, wherein the support housing has legs of thermally non-conductive material.

11. Apparatus according to claim 1, wherein the floor is disc-shaped and the inner wall surrounds the circumference of the floor.

12. Apparatus according to claim 1, wherein one or more of the floor, inner wall, first sealing means, second sealing means and an underneath surface of the lid are coated with non-stick material.

13. Apparatus according to claim 6, wherein there is a cavity defined by the plane in which the second sealing means lies and an underneath surface of the lid, the vent means being located in the lid so as to permit the escape of steam from the cavity.

14. Apparatus according to claim 1, wherein one or more handles are fitted to the base in a manner which limits the conduction of heat from the base to the handles.

15. Apparatus according to claim 1, wherein the lid has one or more handles.

16. Apparatus according to claim 13, wherein the vent means is sufficiently small that there is no substantial-break in the evenness of radiation of heat from the lid.

17. Apparatus according to claim 13, wherein the lid is of sufficient weight that it cannot be lifted by the internal pressure of steam when the vent means is operating.

18. Apparatus according to claim 1, wherein the base and lid are connected by a hinge means, so that the lid may be conveniently opened by gripping one or more handles provided on it, and wherein the hinge means enable the lid to be closed so as effectively to seal the apparatus for use in a cooking or heating operation.

* * * * *